United States Patent [19]

Mathieu

[11] 3,869,935

[45] Mar. 11, 1975

[54] MECHANICAL DEVICE FOR CONVERTING A CONTINUOUS ROTARY MOTION INTO AN ALTERNATING ROTARY MOTION

[75] Inventor: Raymond Mathieu, Paris, France

[73] Assignee: Thomson-CSF, Paris, France

[22] Filed: July 19, 1973

[21] Appl. No.: 380,676

[30] Foreign Application Priority Data
July 21, 1972 France .................. 72.26419

[52] U.S. Cl. ................ 74/322, 74/125.5, 74/70
[51] Int. Cl. .. F16h 19/00, F16h 27/00, F16h 29/12
[58] Field of Search ............ 74/70, 322, 125.5, 435, 74/436

[56] References Cited
UNITED STATES PATENTS

| | | | |
|---|---|---|---|
| 987,049 | 3/1911 | Coventry | 74/125.5 |
| 1,408,289 | 2/1922 | Groot | 74/322 |
| 1,429,064 | 9/1922 | Curtis | 74/322 |
| 2,586,296 | 2/1952 | Browning et al. | 74/125.5 X |

FOREIGN PATENTS OR APPLICATIONS

| | | | |
|---|---|---|---|
| 1,157,048 | 11/1963 | Germany | 74/125.5 |

Primary Examiner—Samuel Scott
Assistant Examiner—P. S. Lall
Attorney, Agent, or Firm—Cushman, Darby & Cushman

[57] ABSTRACT

A mechanical device for deriving an alternating rotary motion of uniform velocity in both directions, from a continuous uniform velocity rotational motion. Two wheels having the same axis of rotation are connected through intermediate gears in order to rotate in mutually opposite directions. A ball is driven by a crank between the mutually opposite faces of the wheels; each of these faces being provided with a frustoconical cavity, the ball, by transfer from one cavity to the other one, alternately couple the cank to one wheel and then to the other one.

6 Claims, 3 Drawing Figures

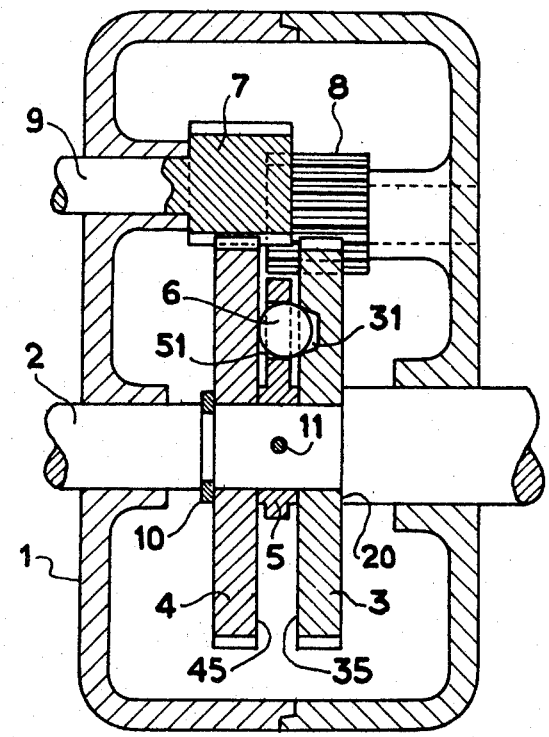
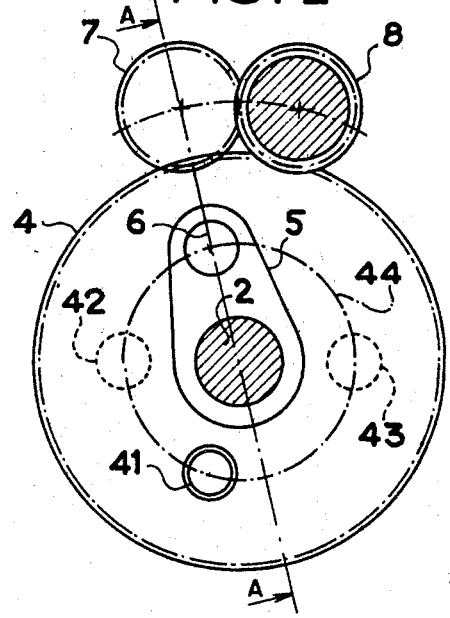

3,869,935

MECHANICAL DEVICE FOR CONVERTING A CONTINUOUS ROTARY MOTION INTO AN ALTERNATING ROTARY MOTION

The present invention relates to a mechanical device for converting a continuous rotary motion into an alternating rotary motion.

The known mechanisms of this kind are generally made-up of a crank and a rod; they have the drawback that they produce an alternating motion of sinusoidal velocity when a continuous motion of uniform speed is applied to them, and therefor do not allow transmission of a constant torque. Other known mechanisms rest upon complex gear profiles which are difficult to machine.

It is an object of the invention to produce in a simple way a reversible mechanism for converting a continuous rotational motion of uniform velocity, into an alternating rotational motion of uniform velocity in both directions.

According to the invention, there is provided a mechanical device for converting a continuous rotary motion into an alternating rotary motion in reverse directions, comprising: a first and a second wheel parallel to each other and independently rotatable about a common axis said wheels having respective opposite faces located at a first predetermined distance from one another and being provided with respective recesses on said opposite faces; driving means for transmitting the rotation of one of said wheels to the other one in the reverse direction; a first shaft coupled to said driving means; a second shaft parallel to said common axis; a component located between said wheels and coupled to said second shaft for rotating about said common axis; and a coupling element carried by said component movably in relation thereto and at a second predetermined distance from said common axis for alternatiely engaging with the respective recesses of one or the other of said wheels; whereby, when one of said shafts is given a continuous rotary motion, the other one provides an alternating rotary motion in reverse directions according to which one of the wheels is coupled to said component by means of said coupling element.

The invention will be better understood and other of its features rendered apparent, from a consideration of the ensuing description and the accompanying related drawings in which:

FIG. 1 is a sectional view, of an embodiment of a mechanism in accordance with the invention;

FIG. 2 is a simplified profile view showing the main elements of the mechanism of FIG. 1;

Figure 3:
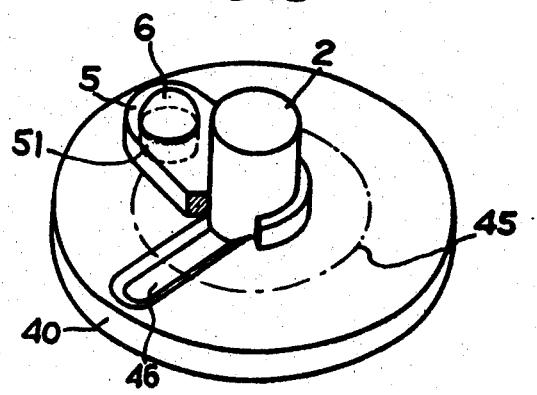
FIG. 3 is a perspective view of the main elements of a variant embodiment of a mechanism in accordance with the invention.

In these figures, similar references relate to similar components.

The mechanism has a housing 1 consisting of two parts which fit into one another. Two shafts 2 and 9 pass to the outside of said housing. For the purposes of the following description it will be assumed that the mechanical power to be converted is supplied to the shaft 2, which thus makes up the input shaft, in the form of a continuous rotational motion in a clock-wise direction considering FIG. 2, and the the mechanical power transmitted by the mechanism is extracted from the shaft 9, which plays the part of the output shaft.

Two cylindrical gears 3 and 4 are carried by the input shaft 2, inside the housing; these gears are mounted for freely rotating thereupon but are prevented from translating axially in relation to the input shaft, by means of a shoulder 20 on said shaft, on the one hand, and a stop ring 10, on the other. The two gears are coupled together through a set of two intermediate gears 7 and 8 designed to reverse the direction of rotation of one of the gears in relation to the other. These intermediate gears are identical and have axes parallel to the common axis of the two other gears. The first intermediate gear 8 (arranged in front of the gear 4 in FIG. 2) meshes, on the one hand, with the gear 3 and, on the other hand, with the intermediate gear 7; the latter is rigidly locked with the output shaft 8 and meshes with the second gear 4.

In the described embodiment, the gears 3 and 4 have the same number of teeth so that when they move they have identical angular velocities, of opposite directions. The angular velocity of the output shaft 9 is related to the angular velocity of the gear 4 in the ratio of the numbers of teeth respectively carried by the gears 4 and 7.

The input shaft drives a crank 5 which is arranged between the gears 3 and 4 and is fixed to the shaft by means of a pin 11. The hub of the crank keeps a constant spacing between the gears 3 and 4. The crank has a maximum radius which is less than the root radius of the toothing of the gears so as not to interfere with the operation of the gears. The crank is provided at its end with a cylindrical opening 51 containing a coupling ball 6. This opening has its axis parallel with the input shaft and has a diameter slightly larger than that of the ball in order to enable the latter to move freely.

The diameter of the ball is greater than the distance separating the planes of the facing faces of the gears 3 and 4 so that the ball, in resting against the flat face of one of the gears, partially occupies a cavity provided on the facing face of the other gear. In FIG. 1 the facing faces of the gears are marked 35 in the case of the gear 3 and 45 in the case of the gear 4; they each contain a cavity, 31 in the case of the gear 3, and 41 in the case of the gear 4, located at the same distance from the common axis of the gears 3 and 4 as the opening 51; these cavities are identical and take the form of a frustum of a cone, the axis of which is parallel to that of the input shaft 2.

Since it occupies the cavity 31, the coupling ball 6 establishes a rotational connection between the crank and the gear 3; the gear 3 is thus driven at the same angular velocity as the input shaft; through the set of intermediate gears 7 and 8, the gear 4 is driven at the same angular velocity but in the opposite direction, that is to say in the anticlockwise direction considering FIG. 2.

The lateral walls of the cavity 31 are inclined in order to apply to the ball, as a result of the motion of the latter a reaction force the transverse component of which (perpendicular to the plane of the face 35), is directed towards the exterior of the cavity. Through the action of this transverse component the ball 6 is maintained in contact with the face 45 of the gear 4 over which it slides and rolls describing a circular trajectory 44 centred on the axis of the input shaft 2 and passing through the centre of the cavity 41.

During their opposite motions, the ball in the cavity 31, and the cavity 41 itself, meet each other at a position 43 which is fixed in relation to the housing. Through the action of the transverse reaction force, the ball is pushed out of the cavity 31 so that is ceases to drive the gear 3, and enters the cavity 41 thus driving the gear 4 and giving it a rotational motion in the clockwise direction considering FIG. 2. The transfer of the ball from one cavity to the other produces a reversal in the direction of rotation of the gears 3 and 4 the intermediate gears 7 and 8 and the output shaft 9. Correct transfer of the ball 6 from one cavity to the other can only occur if there is a genuine reaction force from the gear 3, that is to say if there is a resisting torque on the output shaft in order to brake the intermediate gears and the main gears, and in particular the gear 3; the resisting torque required for the proper operation of the mechanism in the absence of any load is small as compared with the maximum torque which the mechanism is able to transmit. Because of the presence of this reaction force, the ball cannot remain stable in an intermediate position between the two cavities. During the second alternation, the ball 9 engaged in cavity 41 slides and rolls over the flat surface 35 of the gear 3.

This second alteration is continued until the ball occupying the cavity 41, meets the cavity 31, this taking place at a position 42 diametrally opposite to the position 43. At this particular point, the process of reversal is initiated all over again; the ball is pushed out of the cavity 41, enters the cavity 31 and drives the gear 3, this process marking the beginning of the next cycle.

During one cycle, the ball describes a circumference passing through the positions 42 and 43, driving the gear 3 from the position 42 to the position 43 and driving the gear 4 from the position 43 to the position 42; the cavity 31 describes a half circle from the position 43 to the position 42 when it contains the ball, and describes the same half circle in the opposite direction during the next alternation; in a symmetrical way, the cavity 41 describes the second half circle from positions 42 to 43, in the absence of the ball, returning from position 43 to position 42 when it contains the ball.

The alternating rotary motions of 180° amplitude carried out by the gears 3 and 4, are transmitted to the output shaft 9 with a corresponding amplitude multiplied by the ratio of the numbers of teeth. If the input shaft is driven so as to be given a continuous rotational motion of uniform angular velocity, the output shaft will carry out an alternating rotary motion of uniform velocity in both directions.

The mechanism is reversible in the sense that if, viceversa, the shaft 9 is imparted a continuous rotary motion, the shaft 2 will be imparted an alternating rotary motion by the mechanism. In this second mode of operation, the gears 3 and rotate in opposite directions, in a continuous manner. The cavities 31 and 41 describe in opposite directions the same circular trajectory passing through the positions 42 and 43 which are the points at which the cavities meet. At the beginning, the ball occupies the cavity 31 and drives the crank 5 and the input shaft 2; at the meeting point 42 the ball is displaced from the cavity 31 in the same fashion as before, by the action of the transverse component due to the inclination of the lateral walls of the cavity; the crank ceases to be driven, the ball enters the cavity 41, and thus the crank is coupled to the gear 4 which drives it in the opposite direction towards the position 43.

The ball alternately describes a half circle from the positions 42 to 43, changing cavities at each meeting point. The crank 5 and the shaft 2 follow the same alternating rotary motion as that of the ball.

In a different embodiment, shown on FIG. 3, the recess within each gear for engaging with the ball 6 is no longer a frustoconical cavity but a radial groove of trapezoidal section, the bottom of the groove constituting the smaller base of an isosceles trapezium; on FIG. 3 groove 46 extends along a radius of a main wheel 40 which plays the same part as the gear 4 shown in FIGS. 1 and 2; the inclined lateral walls of the groove perform the same function as the lateral wall of a frustoconical cavity; this embodiment makes it possible for the crank 5 and the main wheels to be independently machined, the position of the recess in each wheel not being associated with the position of the opening 51 in the crank.

The present invention is not limited to the embodiment described; different devices could be used to drive the two main wheels 3 and 4 in opposite directions, and different drive components, other than a crank, could be used to drive the ball along the circular trajectory hereinbefore defined.

Two gears having different number of teeth can also be used in order to derive, from a continuous motion of uniform velocity, an alternating motion in which the angular velocity during the course of the second alternation, differs from that during the first.

Of course, the invention is not limited to the embodiments described and shown which were given solely by way of example.

What is claimed is:

1. A mechanical device for converting a continuous rotary motion into an alternating rotary motion in reverse directions, comprising: a first and a second wheel parallel to each other and independently rotatable about a common axis said wheels having respective opposite faces located at a first predetermined distance from one another and being provided with respective recesses on said opposite faces; driving means for transmitting the rotation of one of said wheels to the other one in the reverse direction; a first shaft coupled to said driving means; a second shaft parallel to said common axis; a component located between said wheels and coupled to said second shaft for rotating about said common axis; and a coupling element carried by said component movable in relation thereto and at a second predetermined distance from said common axis for alternately engaging with the respective recesses of one or the other of said wheels; whereby, when one of said shafts is given a continuous rotary motion, the other one provides an alternating rotary motion in reverse directions according to which one of the wheels is coupled to said component by means of said coupling element.

2. A mechanical device as claimed in claim 1, wherein said recesses have sidewalls which are sloped towards their bottom at least in the portions perpendicular to their direction of rotation.

3. A mechanical device as claimed in claim 2, wherein said coupling element is a ball whose diameter is greater than the distance separating said opposite faces of said wheels.

4. A mechanical device as claimed in claim 2, wherein each of said recesses is a radial groove of trapezoidal section.

5. A mechanical device as claimed in claim 2, wherein each of said recesses is a frustoconical cavity having an axis parallel to said common axis of rotation.

6. A mechanical device as claimed in claim 2, wherein said wheels are made-up by gear wheels and wherein said driving means comprise intermediate gears.

* * * * *